Nov. 14, 1933.  H. B. HOWRY  1,935,398

MOISTURE RESPONSIVE INSTRUMENT

Original Filed May 3, 1930

Inventor
Hobart B. Howry
By Lynn H. Latta
Attorney

Patented Nov. 14, 1933

1,935,398

UNITED STATES PATENT OFFICE 1,935,398

MOISTURE RESPONSIVE INSTRUMENT

Hobart Beecher Howry, Sioux City, Iowa, assignor, by direct and mesne assignments, to National Air Conditioning Company, Sioux City, Iowa, a corporation of Iowa Application May 3, 1930, Serial No. 449,523
Renewed March 14, 1932

5 Claims. (Cl. 200—52)

My invention relates to moisture responsive instruments of the type employed for controlling air conditioning systems.

Instruments of this order have commonly been called hygrostats. The term hygrostat will be used in the present case to denote an instrument of this character.

More particularly my invention relates to the "so called wet and dry bulb" type of hygrostat.

The primary object of my invention is to provide a hygrostat having a relatively high degree of accuracy.

The invention is also applicable to hygrometers or moisture recording instruments.

Both hygrometers and hygrostats in common usage today are subject to the objection that they are very inaccurate. This is true both of the wet and dry bulb type and the hair hygrometers which are also commonly used.

The present invention aims to provide an instrument of this type which will respond accurately to humidity changes irrespective of the temperature of the atmosphere to which it is subject. It will be understood in this connection that the amount of moisture which the atmosphere can hold varies directly with the temperature and that as the temperature is increased, the absolute humidity or amount of moisture per cubic foot of air must increase in order that the relative humidity may remain constant.

Assuming that relative humidity then is the ratio between the amount of moisture which the atmosphere can hold at a given temperature and the amount of moisture actually present at that temperature, the present invention purposes to provide an instrument which will respond accurately in exactly the same manner to the same relative humidity at any temperature to which such an instrument might be subject such as for instance from zero degrees to 220° Fahrenheit.

Another object is to provide an instrument of this type which will respond accurately under varying conditions of air movement in the region in which the instrument is located.

Another object is to provide a hygrostat including a wet and dry bulb assembly, an electrical switch arm and novel means linking the wet and dry bulb assembly and the switch arm to provide accuracy and ease of movement.

A further object of my invention is to provide a device of this character which is of simple, durable and inexpensive construction.

Another object of my invention is to provide an instrument to be used in connection with means for humidifying and means for dehumidifying a region of atmosphere, the instrument being capable of actuating both the humidifying and the dehumidifying mechanisms upon a change in either direction from a given predetermined relative humidity.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 2:
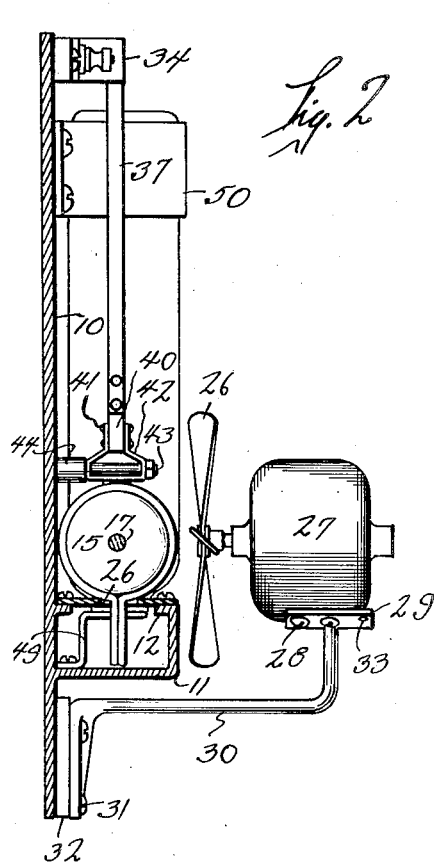
Fig. 2 is a vertical, sectional view taken on the line 2—2 of Fig. 1.
Figure 1:
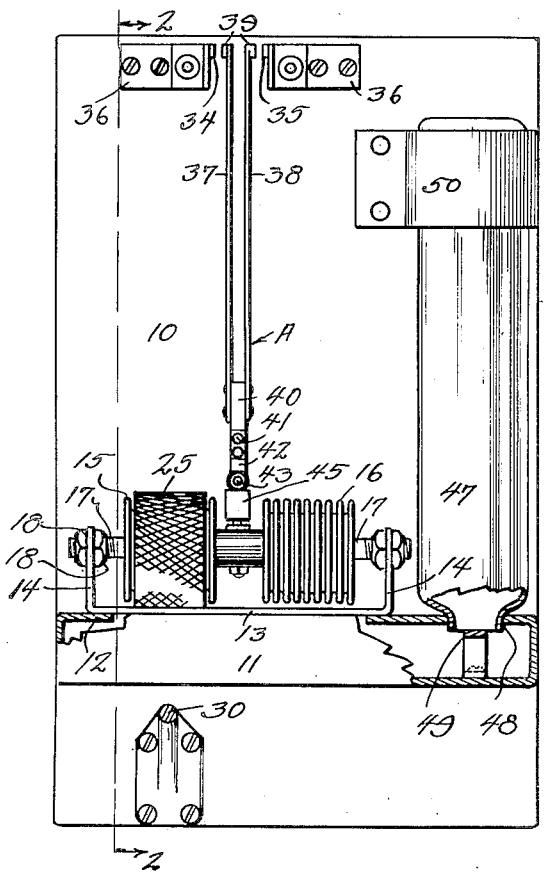
Fig. 1 is a front elevation of an instrument embodying my invention.
Figure 3:
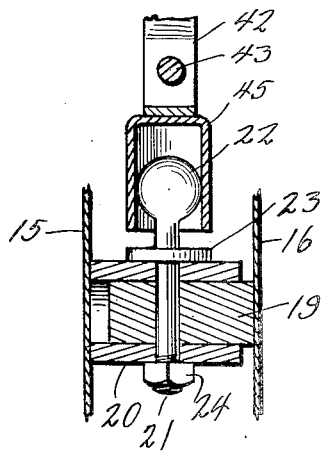
Fig. 3 is a detail, sectional view through the link which connects the wet and dry bulb assembly with the switch arm.

I provide a base for the instrument comprising a back panel 10 and a water pan 11 cast integrally therewith. The pan 11 has a peripheral flange 12 to which is secured a cover plate 13, the ends of which are turned up to form ears 14 for supporting the wet and dry bulbs 15 and 16, respectively. Studs 17 are secured to the ends of the bulbs 15 and 16 and are extended through the ears 14 and secured by nuts 18.

To one of the bulbs is secured a shank 19 and to the other bulb is secured a socket 20 which receive the shank 19. Registering holes are provided in the shank and socket and a stud 21 is extended through these holes. On the upper end of the stud 21 is a ball 22. The stud 21 is secured by an integral shoulder 23 and a nut 24.

The wick 25 extends around the wet bulb and through a slot 26 in the cover plate 13 into the pan 11.

A fan 26 driven by a small electrical motor 27 is mounted directly in front of the wick 25. The motor 26 is secured by means of screws 28 to a bracket 29 on the end of an arm 30 which is secured as at 31 to the back panel 10. A resilient cushion 32 is interposed between the arm 30 and the back panel 10.

A plurality of openings 33 provide for adjustment for the motor and fan away from the wet bulb.

A pair of switch points 34 and 35 are secured to suitable insulating block supports 36 which are in turn secured to the back panel 10.

The switch arm A has the two resilient fingers 37 and 38 which are provided with switch points 39 to engage respectively the switch points 34 and 35.

The fingers 37 and 38 are secured to a post 40 of insulating material which in turn is secured between the arms 41 of a hub bracket 42.

The hub bracket 42 is fulcrumed upon a stud 43 which is provided with an enlarged shoulder portion 44 secured to the back panel 10. The bracket 42 is widened so as to insure proper lateral support for the switch arm.

To the lower side of the bracket 42 is welded a socket 45 in which is received the ball 22. The socket 45 moves vertically as the switch arm swings from side to side and the upper wall of the socket is consequently spaced from the ball 22 to allow sufficient clearance. The ball 22 moves laterally in a straight line under the conflicting pressures from the wet and dry bulbs 15 and 16 respectively.

The compression of the wet and dry bulbs is adjusted by means of the adjusting nuts 18. By this means the switch arm A is set for a given relative humidity by making the adjustments in the atmosphere which it is to control in connection with a sling psychometer to test the condition of the air when the seating is made.

The switch point 34 is connected with a humidifying device in the air conditioning system and if the air becomes too dry the pressure of the bulb 15 will move the arm 37 to close the contacts 34 and 39, thus throwing in the humidifying apparatus and increasing the humidity of the air.

Assuming that the instrument is set for a relative humidity of 70%, giving a two degree temperature depression on the wet bulb and that the switch arm is in contact with the switch point 35 connected to a humidifying device in the air conditioning apparatus and building up humidity a ¼ of a degree rise in temperature of the wet bulb will expand the bulb sufficiently to throw the switch arm into the neutral position shown, cutting out the humidifying device.

Assuming then that the humidity increases beyond the 70% point, the evaporation of the wick 25 will have decreased to such an extent that the switch arm will be thrown into contact with the switch point 34 which is connected to a dehumidifying device and the humidity of the atmosphere will rapidly be reduced by the dehumidifying apparatus.

When the humidity has again reached the proper level the evaporation in the wick 25 will have increased to such an extent that the bulb 15 will have become cooled and will have contracted to allow the pressure of the bulb 16 to move the switch arm back to neutral position.

Assuming then that the humidity drops below the 70% mark, the evaporation in the wick will have further increased sufficiently to allow the bulb 16 to throw the arm again into contact with the humidifying apparatus.

Returning now to a discussion of the provision of means for accuracy of performance, I have discovered that the use of a fan directing a stream of air constantly upon the wick 25; raises the evaporation rate above a level where it can be influenced by changes in the air currents in the region wherein the instrument is located. Mounting of the switch arm provides for accuracy of movement thereof and for accuracy of transmission between the wet and dry bulbs and the arm. I have found by actual tests that the instrument will function with a variation of less than two per cent from absolute accuracy under all conditions.

The instrument has been tested in connection with an air conditioning system controlled by it in a refrigerating plant. In this test, meat that had commenced to deteriorate was placed in the refrigerator and after five days the meat had been so improved in condition that it was rated as being worth twenty cents a pound as compared with five cents a pound which was its rating before it was subjected to the test.

Another feature of importance in connection with the instrument is the use of a water supply reservoir 47, extended through an opening 48 in the pan 11 and supported at a constant height by a bracket 49 secured in the pan. The reservoir assures a constant supply of water and keeps the water at exactly the same level. Thus the water is lifted at the same distance by the wick at all times and the rate of travel of the water up into the wick will be varied only by the changes in humidity of the atmosphere and not by other factors which would detract from the efficiency of the instrument.

A loop 50 is secured to the back panel 10 to support the reservoir 47 in upstanding position.

Another important feature of the invention is the use of a double acting switch in connection with a pair of balanced bulbs, the switch having three positions including a neutral position. The double arm construction of the switch makes it possible to separate entirely the two circuits controlled by the switch.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. In a hygrostat, a base including a vertically positioned panel, a water pan projecting laterally from one side thereof, a cover plate secured to said pan from the ends of said plate, being bent upwardly to form ears, wet and dry bulbs supported between said ears and a switch arm operatively connected with said wet and dry bulbs and fulcrumed upon said panel.

2. In a hygrostat, a base including a vertically positioned panel, a water pan projecting laterally from said panel, wet and dry bulbs supported above said pan, a wick surrounding one of the bulbs and extending into the pan, a member connecting the bulbs, a ball secured to said member and disposed thereabove, a switch arm fulcrumed upon the panel, said switch arm terminating at its lower end in a socket in which said ball is received.

3. In a hygrostat, a base including a panel, a water pan mounted thereon, wet and dry bulbs, a wick surrounding the wet bulb and extending into the pan, a member connecting the bulbs, a ball secured to said member and a switch arm fulcrumed upon the panel and provided at one end with a socket receiving said ball.

4. In a hygrostat, a base, wet and dry bulbs mounted thereon, a shank on one bulb, a socket on the other bulb receiving the shank, a stud extending through the socket and shank and securing them together, a ball formed on the stud and a switch arm fulcrumed upon the base and provided at one end with a socket receiving ball.

5. A moisture responsive instrument comprising wet and dry bulbs balanced against each other and a double acting switch controlled by said bulbs, said switch having three positions including a neutral position and being adapted to control a humidifier and a dehumidifier and to throw either of the devices into operation or to throw either or both of them out of operation.

HOBART B. HOWRY.